United States Patent [19]

Kulinyak

[11] Patent Number: 4,692,094
[45] Date of Patent: Sep. 8, 1987

[54] ROTARY POSITIONABLE INSTALLATION

[75] Inventor: Ernst Kulinyak, Ottobrunn, Fed. Rep. of Germany

[73] Assignee: Messerschmitt-Bölkow-Blohm GmbH

[21] Appl. No.: 825,069

[22] Filed: Jan. 31, 1986

Related U.S. Application Data

[63] Continuation-in-part of Ser. No. 403,519, filed as PCT DE 81/00177 on Oct. 21, 1981, published as WO 82/01747 on May 27, 1982, abandoned.

[30] Foreign Application Priority Data

Nov. 19, 1980 [DE] Fed. Rep. of Germany ....... 3043611

[51] Int. Cl.⁴ ............................................. F03D 11/04
[52] U.S. Cl. ...................................... 416/11; 416/19; 416/140; 416/DIG. 6
[58] Field of Search ................ 416/9, 11, 19, DIG. 6, 416/41 A, 135 A, 43 A, 140 R, 132 B, 138 R, 10

[56] References Cited

U.S. PATENT DOCUMENTS

| | | | |
|---|---|---|---|
| 1,707,235 | 4/1929 | Sargent | 416/43 A X |
| 1,767,303 | 6/1930 | Miller | 416/43 A X |
| 2,484,291 | 10/1949 | Hays | 416/11 X |
| 2,784,556 | 3/1957 | Perdue | 416/11 X |
| 4,298,313 | 11/1981 | Hoffenemser | 416/11 X |
| 4,378,198 | 3/1983 | Pettersson | 416/132 B |
| 4,408,954 | 10/1983 | Earle | 416/43 A X |
| 4,522,561 | 6/1985 | Carter et al. | 416/11 |

FOREIGN PATENT DOCUMENTS

| | | | |
|---|---|---|---|
| 68990 | 4/1949 | Denmark | 416/DIG. 6 |
| 754175 | 4/1952 | Fed. Rep. of Germany | |
| 896390 | 11/1953 | Fed. Rep. of Germany | 416/11 |
| 952250 | 11/1956 | Fed. Rep. of Germany | 416/41 A |
| 652209 | 3/1929 | France | 416/9 |
| 908631 | 4/1946 | France | 416/11 |
| 148943 | 11/1979 | Japan | 416/11 |
| 993117 | 5/1965 | United Kingdom | 416/11 |

Primary Examiner—Everette A. Powell, Jr.
Attorney, Agent, or Firm—Toren, McGeady & Associates

[57] ABSTRACT

The invention shows a rotary positionable installation, such as a wind power, having a tower (11), and an apparatus carrier supported on the tower so as to be rotatable about its axis and rotary positionable by means of an azimuth drive unit, particularly a housing (2), including a frequency adjusting unit (18, 19 27; 40, 42, 46; 66, 74) for the natural yawing frequency of the swinging system of the following components: apparatus carrier (2), azimuth drive unit and tower (1) by adjusting the torsion (rotation) spring constant by means of one of the components and/or the connection between at least two of the components of the swinging system. In this manner, the adjustment of the natural yawing frequency is made possible in a simple manner in respect to construction as well as operation.

10 Claims, 8 Drawing Figures

ROTARY POSITIONABLE INSTALLATION

This is a continuation-in-part application of a copending U.S. patent application Ser. No. 403,519 filed July 9, 1982, filed as PCT DE 81/00177 Oct. 21, 1981, published as WO 82/01747 on May 27, 1982, now

BACKGROUND OF THE INVENTION

This invention relates to a rotary positionable installation mounted on the top of a tower and including a housing or apparatus carrier rotatable about the vertical axis of the tower by an azimuth drive unit.

Wind energy or power installations, originally windmills, for the generation of electric power are designed at the present time with substantial dimensions, for example, a reinforced concrete tower of about 120 m height and 3.5 m diameter and a rotor or propeller of 145 m diameter for a rated electrical power of 5 MW, and for a significant service life of more than 20 years, note the company document MBB-Wind Energy Installation WEA 5000 (GROWIAN II), 1979.

In this installation, the tower carries, over a fully rotatable rotary connection, a nacelle or housing as the apparatus carrier with a supporting structure, components, such as an electric generator, and the housing, in turn, supports a rotor or propeller for the conversion of wind power into electrical power. This rotary connection which includes an azimuth drive unit, has an outer ring fixed to the tower with a toothed rim engaged over two pinions by the azimuth drive unit fixed to the housing, for rotating the supporting structure and housing during operation relative to the tower, so that the propeller can follow or track the changing wind directions for obtaining the maximum electrical power from the wind power.

To avoid a slack, that is, a reverse play, as known by the inventor, the azimuth drive unit has two drives arranged in the housing which are braced relative to one another in a known manner, by a braced drive, with the two drives having two identical, multi-step planetary gear units or "cyclo" gear units in a trundle arrangement.

This wind power installation forms in various respects a swinging system which is excited periodically, particularly by the propeller. To prevent destruction or damage to the wind installation, the natural frequencies of the wind power installation must be sufficiently spaced from the exciting frequencies. These natural frequencies cannot be determined exactly when the wind power installation is designed and constructed, that is, the yawing frequencies measured in a known manner after the installation has been constructed differ from the theoretically determined values and, therefore, the wind power installation must be adjusted subsequently during actual operation.

This pertains particularly to the natural yawing frequency, the torsion frequency of the tower. In the past, the adjustment of such natural yawing frequencies had been effected by providing additional weights in the housing spaced as far as possible from the bearing of the rotary connection. These additional weights, however, result in an undesirable increase in the weight supported by the tower and, thus in a reduction of the natural bending frequency of the tower which, in turn, must be corrected as much as possible.

Difficulties similar to those occurring in wind power installations occur generally in all large installations in which rotary positioning is effected on an elevated structure, for example, in a tower mounted crane or a reflector antenna installation, that is, a radio telescope, particularly if a braced gear unit or a trundle is used for this purpose.

SUMMARY OF THE INVENTION

Therefore, it is the primary object of the invention to provide a rotary positionable installation of the above-mentioned type wherein the adjustment of the natural yawing frequency is particularly simple with respect to its construction and operation.

In accordance with the invention, a frequency adjusting unit for the natural yawing frequency of the swinging system is made up of an apparatus carrier or housing, an azimuth drive unit and a tower. Adjustment is effected by varying the torsion or rotation spring constant of one component or of the connection between two of the components of the swinging system based on known test measurements. The structure mounted on top of the tower is positioned, such as in wind power conversion, to achieve the maximum conversion of wind power to electrical power.

It is apparent
that the adjustment of the yawing frequency, in accordance with the invention, can be achieved independently from the weight, that is, without employing additional weights solely for use in the adjustment operations, and that the adjustment of the respective torsion spring constant desired in accordance with the invention can be effected
relatively easily and
in addition, continuously variably so that it is especially accurate.

In a first preferred embodiment (modification I) of the wind power installation according to the invention:

In the conventional trundles used in the past for wind power installations, the driven pinion is supported cantilevered on the drive shaft. The forces from the gearing are supported by a shaft over two bearings at a relatively great distance from the trundle, so that this shaft, due to its length, causes about 80–95% of the torsion angle, depending upon the type of gear unit and total transmission ratio.

If the pinion is supported independently from the gear unit fixed to the housing, the support over the shaft is no longer necessary and, therefore, the shaft can be constructed shorter and, if necessary, the gear unit can be constructed about four times stiffer which substantially increases the natural yawing frequency.

If, however, the length of the shaft is unchanged and the shaft is provided with external teeth which are identical to internal teeth in the pinion, the servomotor including the reduction gear unit connected therewith can be moved relative to the pinion for the adjustment of the frequency. This results in a change in the length of the portion of the shaft subjected to a torsional load, which is equivalent to a variation of the torsion spring constant.

In a second preferred embodiment (modification II) of the installation according to the invention:

There is the special advantage as compared to the first embodiment that there is no movement of the relatively heavy servomotor with the reduction gear unit. This second embodiment utilizes movable shrunk-on disk connections.

If the movable shrunk-on disk connections are only arranged on the end of the hollow shaft on the side of the gear unit, a load is applied only to the pinion shaft, so that the mutual engagement of hollow shaft and pinion shaft is relatively soft. When these shrunk-on disk connections are moved in the direction of the pinion shaft, however, the stiffer hollow shaft carries a higher load and the softer pinion shaft consisting of solid material carries a lesser load, so that the engagement becomes stiffer. The stiffest arrangement results when the shrunk-on disk connections are arranged on both shaft ends, that is, these connections support both shafts.

A third embodiment (modification III) of the installation according to the invention is the most preferred at the present time.

It is assumed that each drive unit presupposes that the useful moment is the product of torque Mt and the factor $i/(i\pm 1)$, wherein i—transmission ratio and is stiffly supported relative to the apparatus carrier as the support; accordingly, the torsion spring constant occurs in the drive unit including its shaft relative to the housing of the drive unit. Therefore, the spring characteristic can also be adjusted by the type and softness of the drive connection in the apparatus carrier.

By means of these connecting elements, based on the measured conditions, a continuously variable adjustment can be carried out easily in order to achieve an exact coincidence with the respectively measured natural yawing frequency, wherein — similar to modification II — a particular advantage, as compared to modification I, resides in the fact that the heavy servomotor and associated components do not have to be moved relative to the pinion and not even the pinion has to be moved, that is, the adjustment is effected practically without any weight and, therefore, this is the most advantageous of all three modifications.

By contrast, only the following additional prior art has become known thus far:

note German Pat. No. 819,059
where a force compensation is effected in pump windmills by utilization of a balancing rate, with the compensation mechanism arranged at the spur gear of the pump windmill and, particularly by changing the magnitude of the balancing weight or the lever ratio, the force compensation is adjusted in such a way that the average torque at the wind wheel shaft remains the same during the upward and downward movements of the lever system;

note German Pat. No. 877,280
where a wind power machine whose wind wheel shaft is constructed elastically and resiliently in such a way that the critical rate of rotation is substantially below the rate of rotation during operation, and particularly the elastic wind wheel shaft is formed by a single long spring bar shaft or a plurality of short bar springs arranged parallel to the axis of rotation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
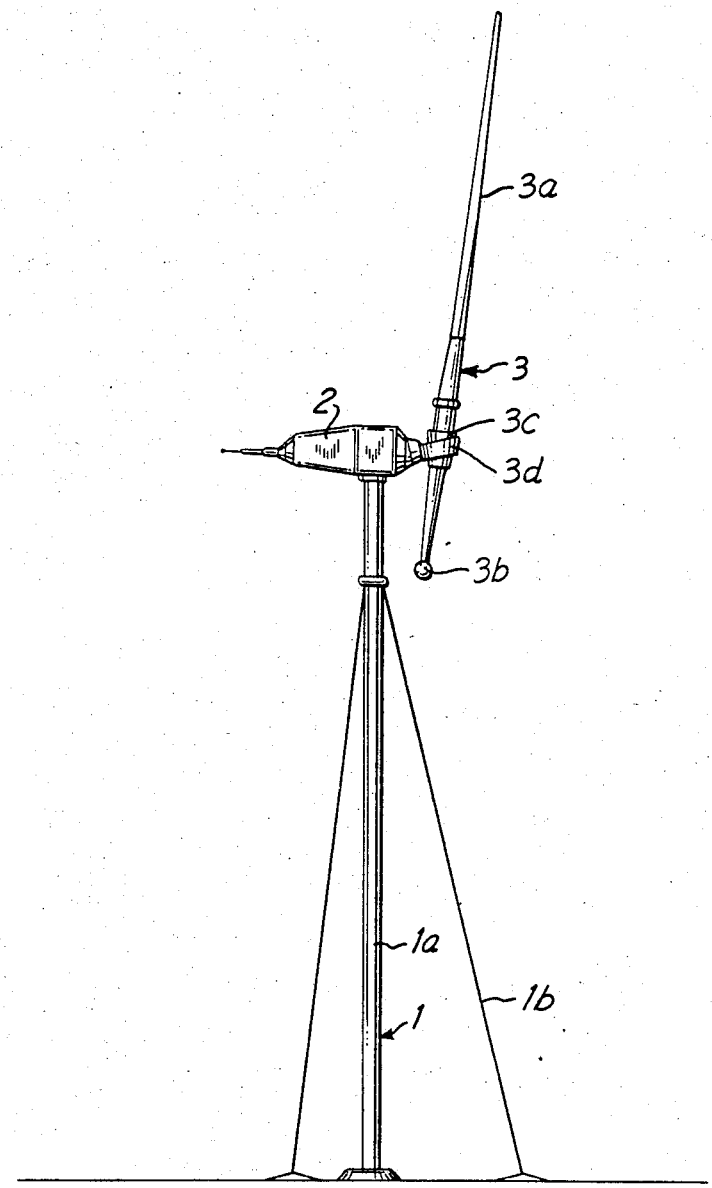
FIG. 1 is a schematic side view of an entire wind power installation in which the present invention is used.

FIG. 1 shows schematically a wind energy installation, according to the illustration in the MBB company document mentioned above at page 2, having a tower 1 composed of a vertically extending support structure 1a and a cable system 1b, a housing 2 forming an apparatus carrier is supported on the top of the tower 1, with the housing 2 containing the following components (not shown in detail): electric generator, support structure, azimuth bearing and azimuth drive unit weight, and a rotor or propeller 3 including a blade 3a, a balancing weight 3b and a hub 3c with a schematically illustrated yoke 3d.

Figure 2:
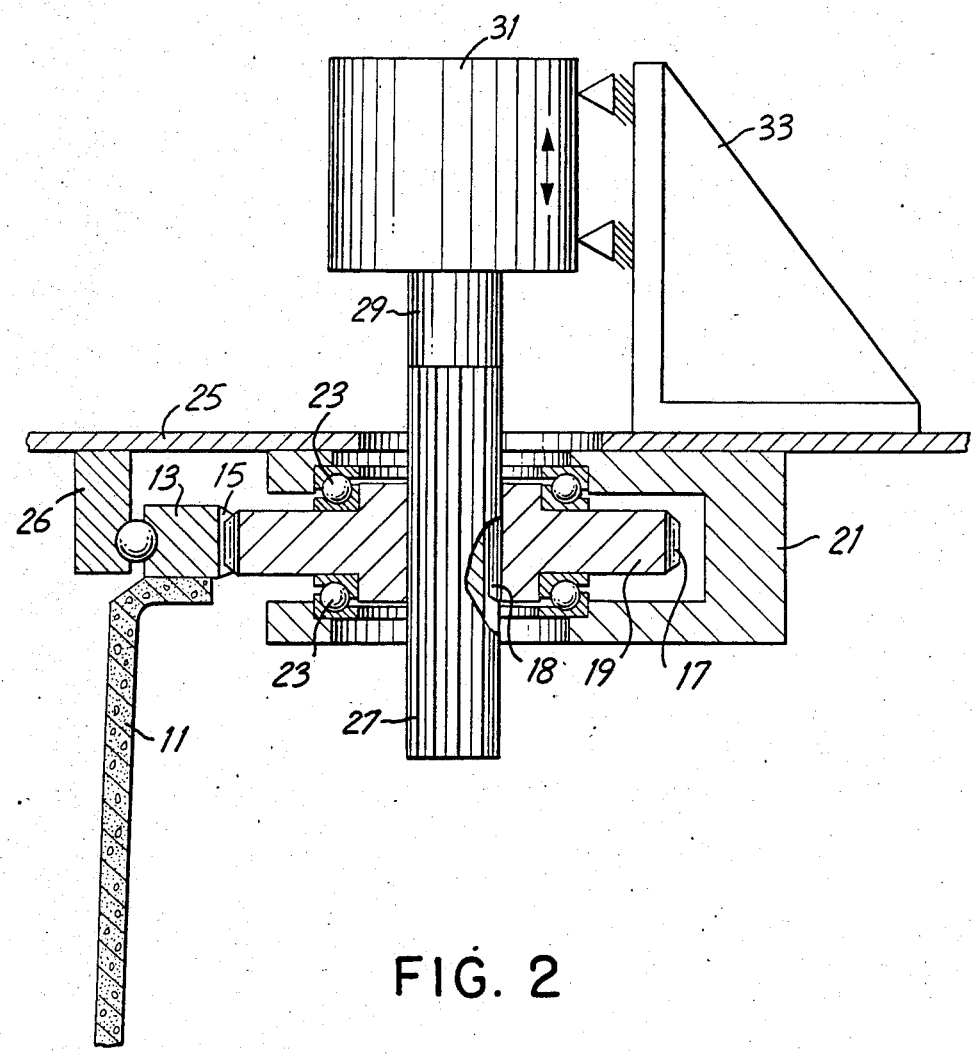
FIGS. 2-4 show three different embodiments (modifications I-III) of a wind power installation constructed in accordance with the invention, each being shown in a side view and partly in section.

FIG. 2 shows a first embodiment (modification I) of the wind energy installation in accordance with the invention:

A side wall 11 of the tower 1, note FIG. 1, supports at its upper end the partially illustrated apparatus carrier as represented by the housing bottom 25. For this purpose, a ring 13, fixed to the tower, is provided, the sectional surfaces on the left of the ring 13 and of wall 11 are not illustrated. Ring 13 has teeth 15 meshing with corresponding teeth 17 on a pinion 19.

Pinion 19 is supported in a bearing bracket 21 by means of bearings 23, and the bearing bracket 21 is rigidly secured to the housing bottom 25.

Internal teeth 18 on pinion 19 are in sliding engagement with corresponding vertically extending teeth 27 of a driven shaft 29. Driven shaft 29 extends downwardly from a reduction gear unit which forms a component 31 composed of a servo motor and the reduction gear unit, the component 31 is shown only schematically in its casing. The drive shaft 29 extends downwardly from component 31 through the housing bottom 25 passing through the bracket 21 and the pinion 19.

Component 31 is vertically movably supported by a support bracket 33 which, in turn, is fixed to the housing bottom 25. This vertical movability or adjustability is indicated by a double arrow at the component 31. The vertically adjustable connection between the component 31 and the bearing bracket 33 can be constructed, for example, as a slot and screw connection, as schematically indicated in FIG. 2.

The housing bottom 25 is supported on the tower by an azimuth bearing 26 secured to and extending downwardly from the bottom 25 and encircling the ring 13 which is fixed to the tower.

The adjustment of the torsion spring constant of the azimuth drive unit, that is, all of the elements in FIG. 2 not a part of the tower or the housing 25, is effected by vertically adjusting the component 31, the adjusting members are depicted schematically.

Figure 3:
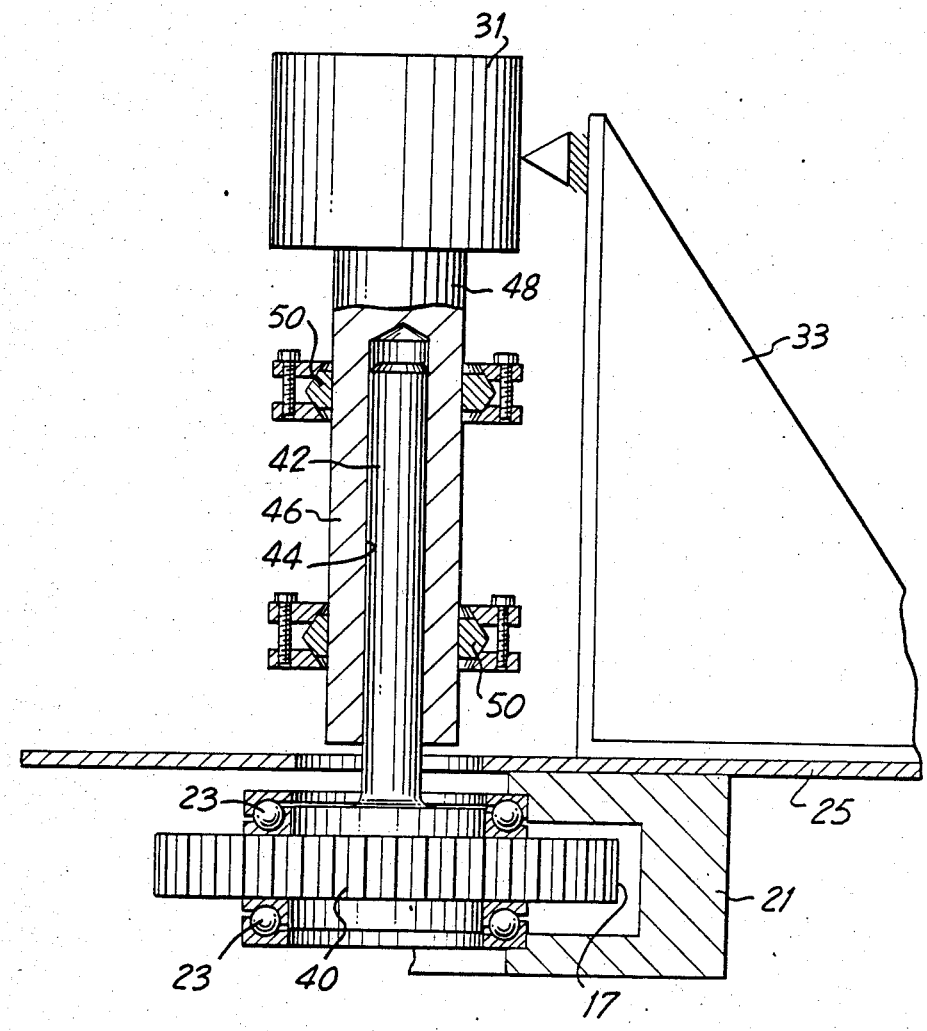

FIG. 3 shows a second embodiment (modification II) of the wind power installation according to the invention.

FIG. 3 is simplified as compared to FIG. 2 inasmuch as the elements 11, 13 and 26 are omitted, accordingly, these elements should be considered as a part of FIG. 3.

Where the same reference numerals are used in FIG. 3 as in FIG. 2, the respective elements correspond to one another.

A pinion 40 mounted in bracket 21 is connected to the lower end of a vertically extending pinion shaft 42 located within the center bore 44 of a stiff hollow shaft 46 forming the lower end of a vertically arranged driven shaft 48 extending downwardly from the component 31.

In this second embodiment, pinion shaft 42 and hollow shaft 46 of driven shaft 48 are connected by movable shrunk-on disks 50 which are provided in the vertically extending region of the upper part of the pinion shaft 42 and the hollow shaft 46. The construction of the shrunk-on disks 50 is schematically illustrated in FIG. 3.

Since the structural component 31 is fixed to the support bracket 33 as is illustrated schematically, in this embodiment the adjustment of the torsion spring constant is effected by moving the shrunk-on disks 50 on the hollow shaft 46 as indicated by the double headed arrow in FIG. 3. Note the description of such adjustment in the SUMMARY OF THE INVENTION.

Figure 6:
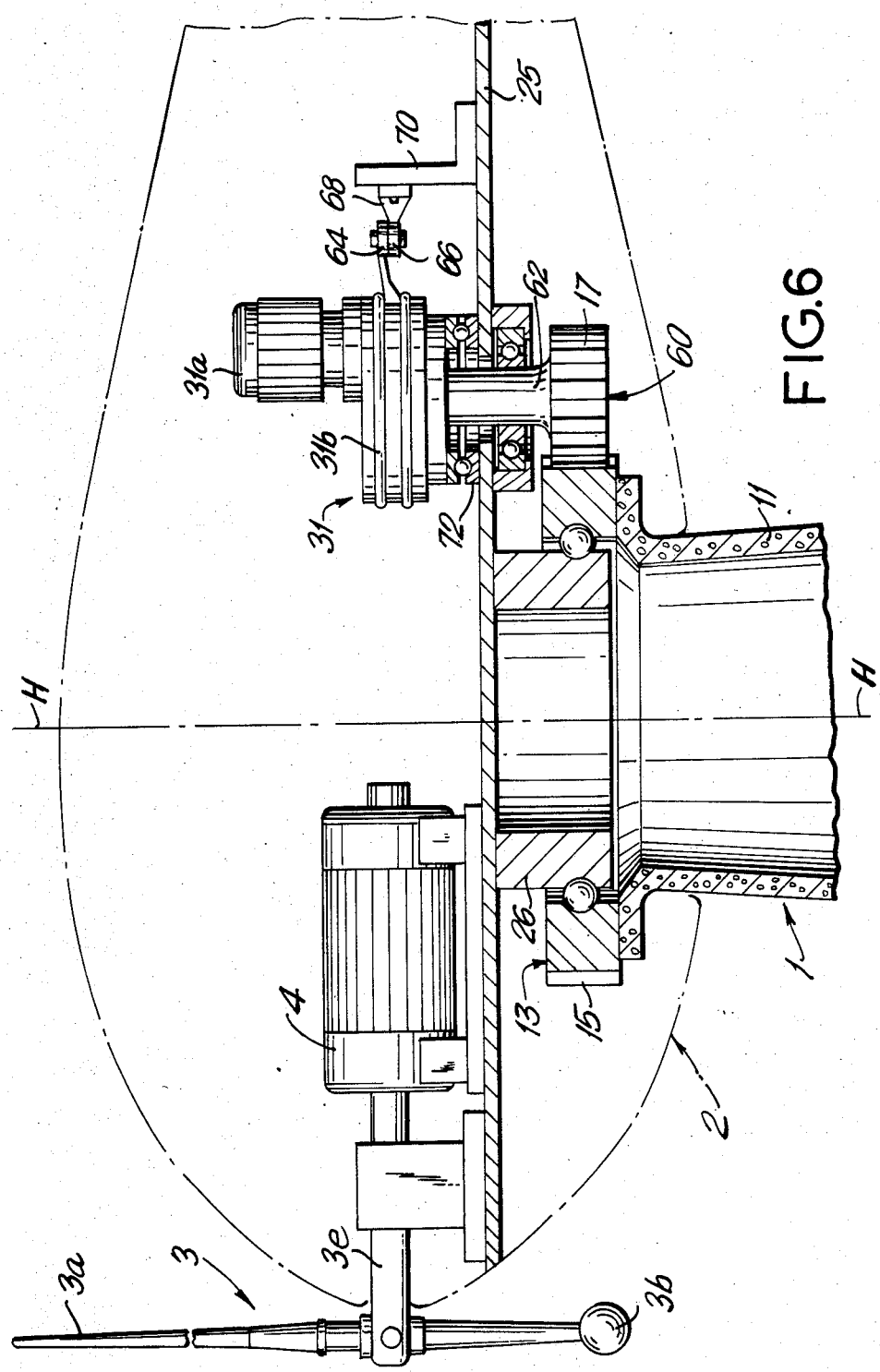
FIG. 6 is a view similar to FIG. 4, however, illustrating in detail the combination of wind power installation and the adjustable force transmission element.
Figure 7:
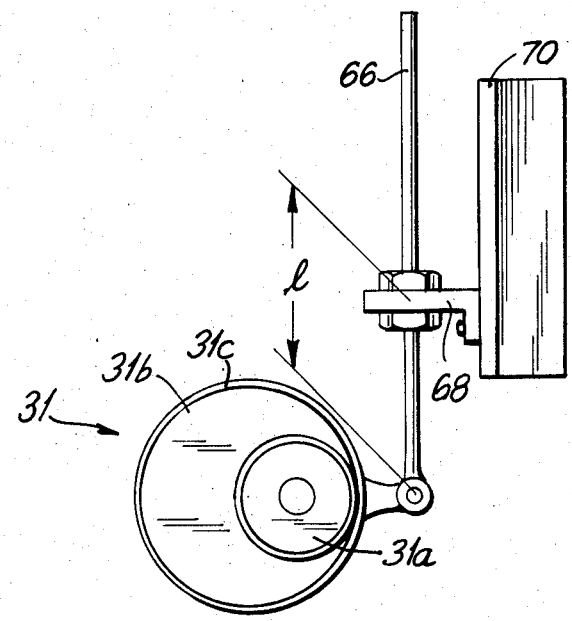
FIG. 7 is a plan view of the force transmission element as shown in FIG. 6.
Figure 8:
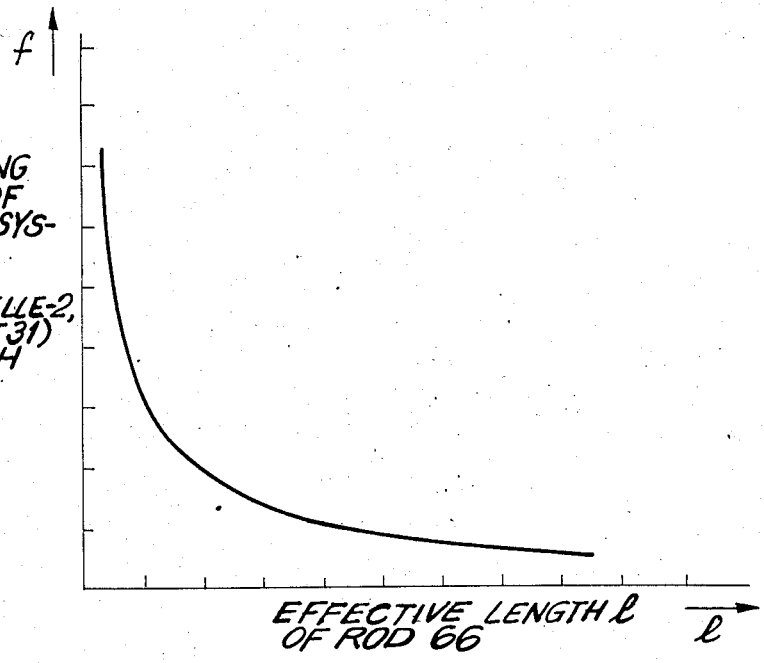
FIG. 8 is a dynamic force diagram indicating the adjustment of the natural yaw frequency.

FIGS. 4-7 illustrate a third embodiment (modification III) of the wind power installation in accordance with the present invention, and FIG. 8 is a graph representing a dynamic force diagram of the adjustment of the natural yaw frequency of the third embodiment.

Parts which correspond to those of the embodiment in FIG. 2 have the same reference numerals as in FIG. 2.

Figure 4:
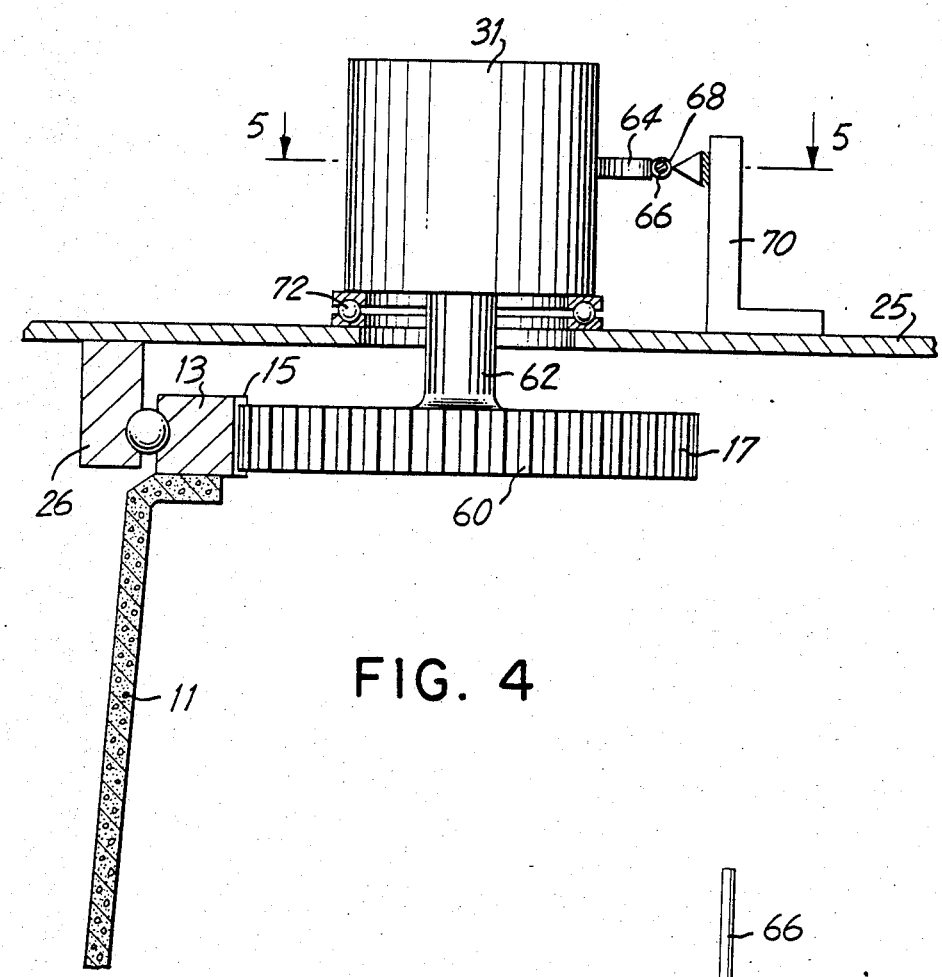

In FIG. 4 a pinion 60 is fixed to the lower part of a downwardly extending driven shaft 62 of the component 31. The casing of the component 31, is connected over the adjustable connecting elements to the housing 2 or the housing bottom 25, as can be seen most clearly from FIG. 5, the section 5—5 of FIG. 4. For this purpose, a pull rod 66 is hinged to a projection 64 of the casing of the component 31, the pull rod 66, in turn, extends through a clamping device 68. Clamping device 68 is supported by a bracket 70 which is attached to the housing bottom 25.

Component 31 is rotatably supported on the housing bottom 25 by means of a rotary bearing 72.

Instead of the pull rod 66, it is also possible to provide an exchangeable spring 74, particularly cup springs, which are supported on a fixed stop 76 on the bracket 70.

Clamping device 68 operates with frictional engagement on the pull rod 66 and can be formed, for example, by a shrunk-on disk, a spring ring element or the like.

Figure 5:
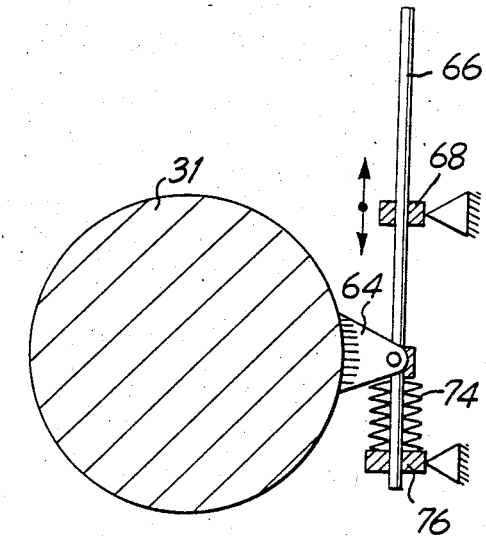
FIG. 5 shows a horizontal cross-section taken along the line 5—5 in FIG. 4.

The mobility of the clamping device 68, note the double arrow in FIG. 5, the section 5—5 of FIG. 4, can be achieved, for example, by moving it in an oblong hole of bracket 70.

In this manner, it is effectively possible, with a very simple construction and very little weight displacement, the weights of the clamping device or of the replaceable springs are practically negligible, to provide the torsion spring constant of the connection between the azimuth drive unit and the actual housing 2 which is shown only by the housing bottom 25.

In FIG. 6 the embodiment of FIG. 4 is displayed in more detail with a part of the housing 2 displayed positioned on the upper end of the tower 1, and the vertical axis H—H of the tower is also shown. The housing 2 extends transversely of vertical axis H—H. Located at one end of and on the exterior of the housing 2 is the rotor 3 including the blade 3a and a balancing weight 3b. The rotor 3 is connected by a shaft 3e through a support to a generator 4. The housing bottom 25 mounts the support for the shaft 3e and the generator. The rotor is arranged transversely of the shaft 3e with the blade 3a located diametrically opposite the balancing weight relative to the shaft 3e.

The rotor 3 and the associated generator 4 are located on the opposite side of the vertical axis H—H from from the component 31.

The component 31 includes a drive motor 31a for rotationally positioning the housing 2 around the vertical axis of the tower 1 for positioning the rotor 3 to obtain the most efficient effect of the wind power. The motor 31a drives a self-locking reduction gear 31b illustrated schematically, such as a worm gear, which engages, by means of downwardly extending drive shaft 62, the pinion 60 by its teeth 17 is in meshed engagement with the teeth 15 on the ring or ring gear 13 fixedly mounted on the upper end of the wall 11 of the tower 1. An azimuth bearing 26 is located within the ring 13 and supports the housing bottom 25 so that the housing 2 can be rotated relative to the tower 1.

The driven shaft 62 extends through an opening in the housing bottom 25 for effecting the rotational positioning of the housing 2.

The component 31 is connected by the projection 64 mounted on the reduction gear housing 31c, note FIG. 7, with the projection extending laterally outwardly from the gear housing to the elongated pull rod 66 which extends horizontally and is spaced laterally outwardly from the axis H—H of the tower 1. The pull rod 66 extends through the clamping device 68 secured to the bracket 70 mounted on and extending upwardly from the housing bottom 25.

An important feature of the invention is that the gear housing 31c is not rigidly connected with the housing bottom 25, rather it is supported on the housing bottom by the rotary bearing 72. The support between the housing bottom 25 and the gear housing 31c is effected by the pull rod 66 which is a spring element with a variably adjustable spring elasticity and with an adjustable effective length l, note FIG. 7. Accordingly, the reaction moment to be transmitted by the gear housing 31c is effected through the pull rod 66 in an elastic manner to the housing bottom 25 so that the bearing 72 permits a corresponding minor rotational movement of the gear housing 31c relative to the housing bottom 25. As pointed out above, the mobility of the clamping device 68 is afforded by movement within an oblong hole in the bracket 70.

As can be seen in the graph of FIG. 8, the natural yawing frequency f of the swinging or rotational system about the axis H—H varies with the effective length l of the pull rod 66. The natural yawing frequency decreases as the effective length l is increased.

By means of the adjustable connection between the gear housing 31c and the bracket 70 it is possible to adjust the natural yaw frequency. The purpose of the invention is not to adjust or correct an imbalance of forces or oscillation damping, but to variably adjust the natural yaw frequency. While in the past the natural yaw frequencies were adjusted by providing additional weights in the housing 2 at the top of the tower, the present invention achieves the desired effect without increasing the weight of the housing 2 and the parts it encloses.

Further, it should be noted when the azimuth drive unit is constructed as a braced drive unit, that is, with two of the drive units illustrated in FIGS. 2-7 provided on the circumference of the tower one behind the other in azimuthal direction and connected together in a known manner, that the desired bracing increases the accuracy of the rotary positioning.

In a wind power installation the prevailing wind direction at the top of the tower can be measured with known testing equipment to determine the preferred position of the propeller 3. The housing 2 is then rotated about the vertical axis H—H by the drive motor 31a to locate the propeller relative to the existing wind condition. As the housing 2 is rotated at the top of the tower 1 the natural yaw frequency may change. The yawing frequencies are measured in a known manner and the required adjustment is made in the third embodiment by adjusting the effective length l of the spring elasticity of the pull rod 66.

While specific embodiments of the invention have been shown and described in detail to illustrate the application of the inventive principles, it will be understood that the invention may be embodied otherwise without departing from such principles.

I claim:

1. A rotary positionable installation, such as a wind energy installation, including an upwardly extending tower (1) of considerable height having a vertical axis and an upper end, an apparatus carrier (2) supported on the upper end of said tower and being rotatable on the upper end about the vertical axis of said tower, and a drive (31) located on the upper end of said tower in operative engagement with said apparatus carrier and the upper end of said tower for positioning said apparatus carrier rotationally about the vertical axis of said tower, said tower with said apparatus carrier and drive form a combination capable of oscillating around the vertical axis of the tower and having a natural yawing frequency, wherein the improvement comprises adjusting means (18, 19, 27, 29, 33; 42, 44, 46, 48, 50; 66, 68, 74) for variably adjusting the natural yaw frequency of the combination of said tower, apparatus carrier and drive, said adjusting means comprises at least one force transmission element (28, 48, 66, 74) positioned in said combination and connected to said drive and said apparatus carrier, and said at least one force transmission element has a variably adjustable spring stiffness means for adjusting the natural yawing frequency of the installation.

2. A rotary positionable installation, as set forth in claim 1, wherein said variably adjustable spring stiffness means comprises a gear shaft connected to said drive and provided with an adjustable torsion spring stiffness, and means in meshed engagement with said gear shaft and supported on said apparatus carrier, and the meshed engagement of said gear shaft with said means being variable in the axial direction of said gear shaft so that the effective length of said gear shaft can be changed by axially displacing said gear shaft relative to said means.

3. A rotary positionable installation, as set forth in claim 2, wherein said means comprises a gearing pinion in meshed engagement with said gear shaft with said pinion having an inside surface closely encircling said gear shaft with teeth on said inside surface, and said gear shaft having teeth on the outside surface and meshed with said teeth on said pinion and said teeth on said shaft being slidable relative to said teeth on the inside surface of said pinion.

4. A rotary positionable installation, as set forth in claim 3, wherein said pinion (19) is supported in a stationary position on said apparatus carrier so that it is not displaceable in the direction of the vertical axis of said shaft, while said gear shaft is displaceable in the direction of the vertical axis of said shaft.

5. A rotary positionable installation, as set forth in claim 1, wherein said variably adjustable spring stiffness means comprises a vertically extending gear shaft (48) connected to said drive (31), said gear shaft comprises a pair of telescopically engaged shaft portions (42, 46), and means located on said gear shaft for non-rotatably connecting said shaft portions and said means being displaceable in the axial direction of said shaft.

6. A rotary positionable installation, as set forth in claim 5, wherein each of said shaft portions (42, 46) have a different torsional rigidity and said means for interconnecting said shaft portions comprises at least one connection element encircling the outer one of said telescopically engaged shaft portions and being slidable on the outer one of said shaft portions in the axial direction of said shaft.

7. A rotary positionable installation, as set forth in claim 1, wherein said drive (31) includes a housing, and said variably adjustable spring stiffness means comprises a spring element (66, 74) resiliently supporting said housing, and said spring element has a variably adjustable spring characteristic in the direction of the force of reaction between said housing and said apparatus carrier.

8. A rotary positionable installation, as set forth in claim 7, wherein said spring element is a pull rod (66) of adjustable length.

9. A rotary positionable installation, as set forth in claim 7, wherein said spring element comprises replaceable plate springs (74).

10. A rotary positionable installation, as set forth in claim 7, 8 or 9, wherein a bearing (72) mounted on said apparatus carrier and having a vertical axis, and said housing mounted on said bearing for rotation on said apparatus carrier about the vertical axis.

* * * * *